United States Patent [19]

Flory et al.

[11] 3,723,011
[45] Mar. 27, 1973

[54] ANGLE SENSOR AND A STEERING SYSTEM BASED THEREON

[75] Inventors: Brian Allen Flory; Roger Michael Geldard, both of Kent, England

[73] Assignee: Sharp and Company Limited, Kent, England

[22] Filed: Oct. 1, 1969

[21] Appl. No.: 862,737

[52] U.S. Cl..............356/152, 250/225, 250/231 SE, 250/204, 318/588
[51] Int. Cl..............................................G05d 1/00
[58] Field of Search .356/117, 152; 250/231 SE, 255, 250/204; 318/588

[56] References Cited

UNITED STATES PATENTS

| | | | |
|---|---|---|---|
| 2,862,169 | 11/1958 | Yragui | 318/588 |
| 2,059,271 | 11/1936 | Parker | 318/588 |
| 2,565,213 | 8/1951 | Falkenstein | 250/225 |
| 3,478,209 | 11/1969 | Feuer | 250/71 |

Primary Examiner—Samuel Feinberg
Assistant Examiner—S. C. Buczinski
Attorney—Irving M. Weiner

[57] ABSTRACT

The phenomenon of light polarization is exploited to provide an improved angle position sensor having a high speed of response, negligible wear, and high resolution. The sensor has first and second parts movable relative to each other and incorporates a light source, a photosensitive element such as a photocell, and polarizing means disposed in the path of light passing from the light source to the photosensitive element, the signal from the photosensitive element giving a measure of the angle of rotation between the parts. Means for imparting a saturation-type response may be used in conjunction with the sensor with a view to avoiding problems connected with possible ambiguity of angle quadrant. The sensor lends itself to control applications and navigational devices.

7 Claims, 4 Drawing Figures

PATENTED MAR 27 1973 3,723,011

INVENTOR
BRIAN ALLEN FLORY ET AL

BY Irving M. Weiner
ATTORNEY

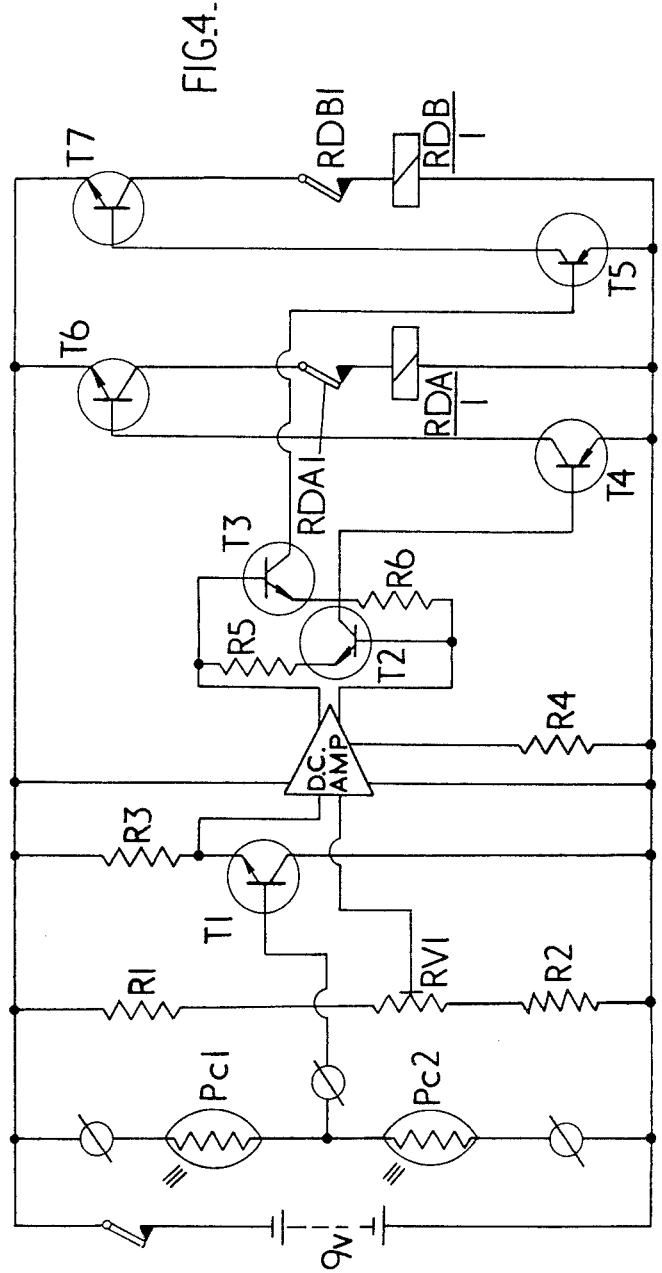

ANGLE SENSOR AND A STEERING SYSTEM BASED THEREON

The present invention relates to position sensors suitable for control systems, more particularly to sensors responding to the angular position of a member.

As is well known in the art, control systems and regulators very frequently involve the determination and comparison of the angular positions of a control (input) shaft and a driven (output) shaft to produce an error signal which is arranged to act so as to bring the driven shaft into the required relationship with the control shaft. The angular position of a shaft is very often determined with the aid of an electrical potentiometer connected or geared to the shaft in some manner.

Potentiometer angle sensors of this kind have a number of disadvantages, including a comparatively high frictional resistance to rotation, significant wear and consequently limited service life and, in the case of wire-wound potentiometers, a limited resolution. In one of its aspects the present invention, which utilizes an optically polarizing media, is the outcome of efforts to provide a solution to these problems.

When a beam of unpolarized light is passed through an optically polarizing medium, such as polaroid sheet, for example, the output beam is substantially plane-polarized. As is well known, it is possible to define a direction (line) in such a medium such that if an incident wave is plane-polarized parallel to that direction then the wave is transmitted with minimum attenuation, whereas if it is plane-polarized perpendicular to that direction — the attenuation is at its greatest. The transmission through two superimposed sheets crossed at right angles is theoretically always zero.

According to one aspect, the invention provides an angular position sensor having first and second parts rotatable relative to each other and comprises a photosensitive element, a light source for illuminating the photosensitive element, and light-polarizing means disposed in the path of light passing from the light source to the photosensitive element, the signal from the photosensitive element giving a measure of the magnitude and sign of the angle of rotation between the parts.

The polarizing means may be entirely, or partly, combined with the source and/or photosensitive element, e.g., a polarized source and/or polarization-sensitive photosensitive element may be used. Alternatively, successive polarizing elements, e.g., "Polaroid" film, may be interposed between the source or sources and the photosensitive element or elements.

In any event, the polarizing arrangement is such that light from the source is polarized by a first polarizing means and is detected to yield the required angular measure via further polarizing means, the amount of crossing of the polarizing means being arranged to depend on the angular position to be sensed so that the output of the photosensitive element or elements varies with the angular position. To obtain an indication of the sign of the variation of the angular position, at least two photosensitive elements are desirable; an asymmetrical polarizing system would give a direction-sensitive output from a single element, but the possible range of angular variation would be limited. We prefer to provide two photosensitive elements, and for each a light path including relatively rotatable polarizing means, the respective polarizing means in the two paths being arranged so that their degrees of crossing (i.e., the obscuration of light produced by them in the paths) vary in opposite directions upon rotation relatively to each other, so that the outputs of the photosensitive elements give a measure of the sign and magnitude of the angle of rotation. This arrangement is particularly applicable to sensing the course of a ship or other vehicle, each light path including a polarizer fixed to the vehicle and a polarizer connected to a compass, so that the outputs of the photosensitive elements indicate the deviation of the vehicle from a chosen heading. In general, the light source and photosensitive elements are fixed to the vehicle.

In one preferred constructional embodiment, we provide an angular position sensor including: a polarizing arrangement comprising a polarizing card and a segment structure made of two polarizing segments rigidly connected relative to each other and arranged so that their lines of polarization are non-parallel and preferably orthogonal, the polarizing sheet and the segment structure being superimposed one on top of the other and rotatable relative to each other about an axis; two photosensitive pickups arranged on one side of the polarizing arrangement; and a light source arranged on the other side of the polarizing arrangement so that during the relative rotation of the polarizing card and the segment structure, signals developed by the pickups, as a result of the varying intensity of the light transmitted to them from the light source through the polarizing arrangement, give a measure in magnitude and sign of the angle of the relative rotation.

The two polarizing segments may take the form of quadrants of circles, while the maximum angle of relative rotation may be limited to ±45° with the aid of stops to give a "saturation" as opposed to an oscillatory type of response, thereby preventing loss of sense for demands greater than ±45° in the case of control systems.

To permit long life combined with minimum attention and maintenance, the light source or sources may conveniently be nuclear-powered light sources.

The angle position sensor lends itself to the construction of steering and blind navigation devices for vessels and moving objects in general. The segment structure can be clamped to the vessel or object in accordance with a cource to be steered, while a compass magnet is rigidly fixed to the polarizing card, which is free to rotate about an axis due to the torque exerted on it by the magnet in the Earth's magnetic field. The magnet and, consequently, the polarizing sheet align in the Earth's magnetic field, i.e., point North. The magnet may advantageously be a ring magnet concentrically disposed relative to the axis of rotation of the polarizing sheet.

The clamping, i.e., the orientation of the segment structure relative to the vessel, may be varied in accordance with a preset program so that a required and, in general, complex course may be followed. The programming device could be such as to permit "dialing" of a direction. In the simplest instance the program would provide for a sequence of straight-line segments to be traversed at constant velocity.

The programmed course may be followed automatically or manually. In the latter case audio or visual means are provided which produce a signal when the guiding arrangement is brought into a new orientation by the programming device; the person or object carrying the guiding arrangement is thereupon required to turn until the null position (i.e., no signal from indicator) is reached, which will correspond to the new course.

A signal derived from the photo-sensitive pickups gives a measure of the magnitude and sign of the deviation off course.

If the steering is to be automatic this signal is fed to a comparator, amplified, and employed to drive a means for turning the rudder in such a manner as to correct the deviation. In the normal manner of automatic control systems a signal is derived from the angle of rotation of the rudder and likewise fed to the comparator, the difference signal output from which constituting the loop error signal. The rudder position signal may, of course, be derived with the aid of a sensor according to our invention.

A control system employing a relay switching circuit for reducing the error signal to zero is disclosed in our British Pat. No. 869,590.

If the steering is not required to be automatic the signal from the pickups, in the event of a deviation off course, can be employed to actuate an indicator device as aforesaid to suitably instruct the helmsman. Such a device may be a buzzer arrangement, for example, the note from which (high or low) would instruct the helmsman whether steering to port or starboard is necessary in order to correct the deviation.

A more simple arrangement utilizing only a single photosensitive pickup can be employed to produce a signal indicating, without sign, the presence of a deviation off course. Such an arrangement can clearly play the role of an off course alarm.

A known steering device exists in which the shadow from an (ordinary, i.e., non-polarizing) card attached to a compass magnet is employed to produce, as it passes over the input windows of two relatively fixed photo-sensitive pickups, a signal giving a measure, in magnitude and sign, of the deviation off course. This known system requires very careful construction if it is to operate at all well, its response tends to be nonlinear, it suffers from shadow parallax effects due to compass tipping, and its response curve "saturates" at typically around ±10°, when the pickup windows become completely covered by shadow. The angle limitation of ±10° slows down the speed of automatic steering very considerably, as the rudder deflection is normally set to be a given fraction $f$ of the demanded steering, which can in effect never exceed around ±10° in the known arrangement.

Our arrangement is free from all the above shortcomings and has, moreover, a response which is substantially linear over a range of ±45°, and which may thereafter be made to saturate, e.g., with the aid of stops, in order to preserve the sense of the signal for demands greater than ±45°.

The invention will be further described with reference to the accompanying drawings, in which:

FIG. 4 is a schematic diagram of a system for producing a loop error signal with provision for audio or visual indication of error sign.

Figure 1:
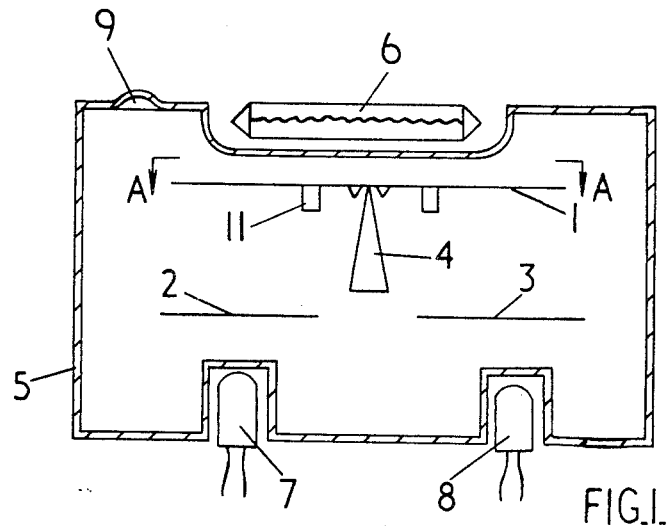
FIG. 1 shows a schematic side view of an embodiment of a sensor according to the invention.
Figure 2:
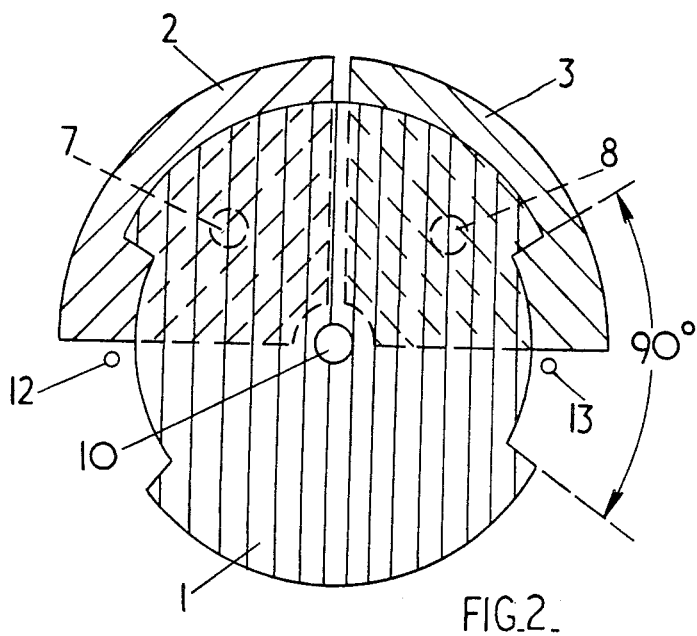
FIG. 2 shows a schematic plan view of a polarization arrangement (in direction A—A in FIG. 1)

In FIGS. 1 and 2 reference 1 denotes a polarizing card and references 2, 3 polarizing segments, shaped as quadrants of circles in the embodiment shown. The card and polarizing segments are made from polarized sheet material. Card 1 is pivotally supported, as by a pin 4 in this embodiment, for rotation about an axis 10, segments 2, 3 are fixed relative to the casing 5, which is provided with indentations to facilitate mounting of a light source 6 and photo-sensitive pickups 7, 8. Casing 5 may advantageously be filled with liquid, and an air space or chamber 9 may be provided to take up any expansion of the liquid.

For applications to steering systems card 1 is provided with a rigidly attached magnet, which may be a ring magnet as shown at 11 in FIG. 1.

In FIG. 2 the card is shown as basically circular in shape with arcuate portions or slot removed so as to subtend an angle of 90° at the center. Stops 12, 13 fixed to the casing are provided which can come up against the radial edges of the arcuate portions to limit the rotation of card to ±45° and thereby preserve the sense of the signal for desired rotations greater than ±45° (and less than ±90°).

To facilitate the understanding of the operation of the device, the direction of polarization for each piece of polaroid material is shown by lines (see FIG. 2). In the mean position shown in FIG. 2, photosensitive pickups 7, 8 will receive equal light intensity and their outputs will be the same (the "mean" level). If card 1 is rotated clockwise the light intensity reaching photosensitive pickup 8 will fall and that reaching photosensitive pickup 7 will rise by an amount depending on the angle of rotation, the electrical signals from the photosensitive pickups 7, 8 varying appropriately about the mean level. If card 1 is rotated anticlockwise the opposite situation obtains, so that the signals from the photosensitive pickups 7, 8 give a measure of the magnitude and sign of the angle of rotation.

Figure 3:
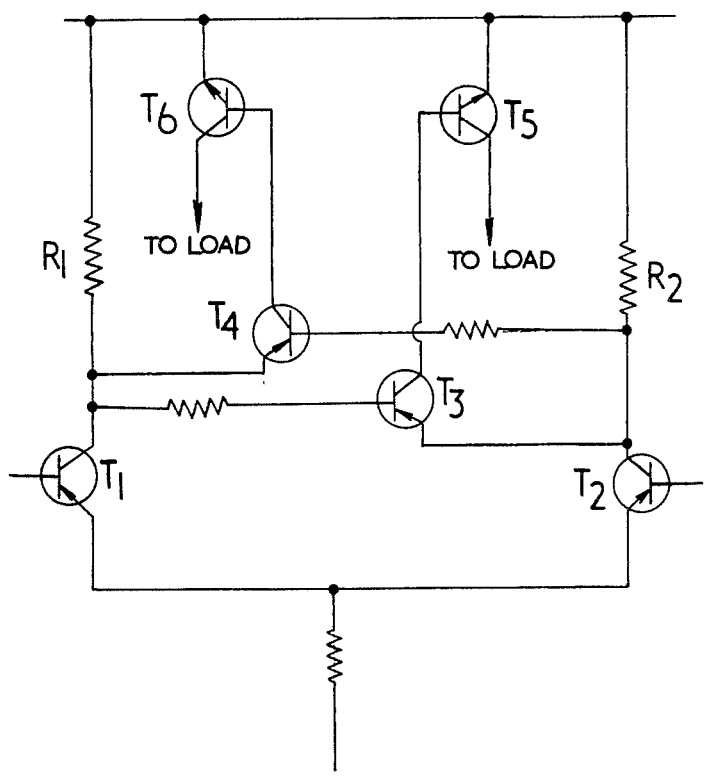
FIG. 3 is a circuit diagram of a semiconductor differential switch for producing a loop error signal.

FIG. 3 shows a semiconductor differential switch suitable for the reduction of a loop error signal to zero. It may replace the relay switching system disclosed in our British Pat. No. 869,590 mentioned above.

The circuit comprises two antiparallel transistors or the like connected between signal inputs and having bias arrangements such that, depending on the relative signs and/or magnitudes of the input signals, either one or the other, or neither transistor conducts; in particular if the input signals are equal neither transistor conducts, if one or the other signals is greater than the other transistor conducts. In one possible arrangement the emitter-base circuits and respective base resistors are antiparallel and the collectors form respective outputs, e.g., controlling output stage transistors.

The circuit forms a three-state differential switch, i.e., it will give three different states of output from a differential amplifier. The "states" are governed by the balance or unbalance of the differential amplifier, and by The polarity of the unbalance. This means that with an unbalance in one direction a transistor, with its emitter tied to rail, will be turned on. While an unbalance in the other direction will turn this transistor off and another on. When the differential amplifier is balanced then both transistors are off. The circuit has the safeguard that it is impossible for both output transistors to be on at one time and cross over to occur regardless of supply voltage.

The collectors of transistors T1 and T2 form the output of a differential amplifier.

When a potential difference occurs between the collectors of T1 and T2, either T3 or T4 will be driven into conduction depending on the polarity of the potential difference. The collectors of T3 and T4 are connected to the bases of t5 and T6 respectively, so that conduction of T3 causes conduction of T5, and conduction of T4 causes conduction of T6. When the differential output is balanced, i.e., zero potential difference between the collectors, then both T3 and T4 and therefore T5 and T6 are in the off condition. The output is summarized by the following table

|           | T5  | T6  |                 |
|-----------|-----|-----|-----------------|
| VR1 > VR2 | off | on  | any combination |
| VR1 = VR2 | off | off | of these is     |
| VR1 < VR2 | on  | off | possible.       |

Here VR1 and VR2 denote the voltages developed across resistors R1 and R2 respectively in FIG. 3.

The error-production and indication system shown in FIG. 4 comprises two photoconductive cells, a means for balancing out any difference between the cells, a differential amplifier for amplification of a signed error signal produced by the cells in response to a deviation off course in the one direction or the other, and a gate for direction of a signal corresponding to a particular sign to a corresponding relay or the like for actuation of an indicator means.

The photo-conductive cells PC1 and PC2 are connected in series across the positive and negative lines. The junction of the two cells is connected to a transistor T1 which is connected in the emitter follower mode to create a high input impedance, which reduces damping on the cells.

The output of T1 drives one input line of a differential amplifier, of an "integrated circuit" construction. The other input line of the differential amplifier is held at a constant potential by the potential divider RV1, R1 and R2. Preset control RV1 is used to eliminate any difference between the two cells.

When the compass card is centered there will be no potential difference between the two inputs of the differential amplifier. If the card rotates from the center position then one or the other cell will receive more light and cause the output potential of T1 to vary. The potential difference between the two lines will be amplified by the differential amplifier.

Depending on the polarity of this potential difference, which in turn is dependent on the direction the compass card is off center, the output of the differential amplifier will cause either T2 or T3 to conduct. The collectors of T2 and T3 are connected to the bases of T4 and T5 respectively. Conduction of T2 causes T4 and T6 to conduct and conduction of T3 causes T5 and T7 to conduct.

The collectors of T6 and T7 are connected to read coils RDA/1 and RDB/1 via contacts RDA1 and RDB1 respectively.

The contacts are normally closed, so operation of a read coil breaks its own supply line and the contacts will vibrate audibly.

Deviation from a prescribed direction will thus cause the appropriate reed switch to vibrate.

We claim:

1. An angular position sensor, which comprises:

a casing;

means defining an indentation in the exterior surface of one end of said casing and means defining two indentations in the exterior surface of an opposite end of said casing;

a light source disposed in said means defining said indentation in one end of said case;

two photosensitive elements, each disposed in a different one of said means defining two indentations in said opposite end of said casing;

a light-polarizing card pivotally mounted in the interior of said casing between said light source and said two photosensitive elements, said card being mounted to pivot in a plane transverse to the plane of light emitting from said light source;

means defining an arcuate notch in the periphery of said light-polarizing card, said means having two radially extending edges subtending an angle of 90° at said pivot mounting of said card;

a stop fixed to said casing contiguous to said means defining said notch to abut against said radially extending edges to limit the rotation of said card to 90°;

a permanent magnet affixed to said light-polarizing card which causes said card to rotate in response to the force exerted on said magnet by the earth's magnetic field;

two light-polarizing segments disposed in side by side relationship between said polarizing card and said photosensitive elements, each of said segments being aligned with a different one of said photosensitive elements and being mounted in fixed positions interior to said case such that each of said elements is across the path of light impinging on the one photosensitive element with which it is aligned, and such that the lines of polarization of said two polarizing segments are mutually perpendicular and are each at an angle of 45° to the lines of polarization of said card when said card is in a mid-position with respect to said casing; and a liquid placed in said casing to act as a damper to any erratic motion of said polarizing card, the magnitude of the output from each of said two photosensitive elements being substantially equal when said card is in the mid-position, and as said card rotates up to 45° either side of the mid-position, the output from one of said photosensitive elements varies down to a minimum value while the output from the other one of said photosensitive elements varies up to a maximum value, the outputs from said two photosensitive elements thus indicating the sense of any deviation of an angular position of said casing from a given position relative to the direction of the pull exerted by the earth's magnetic field on said magnet, and the magnitude of the deviation if it is not more than 45°.

2. A guidance arrangement as claimed in claim 1 in which the photosensitive elements are connected for the supply of an error signal to an actuating system for adjusting the motion of the object so that deviations from the prescribed course are automatically balanced out by servo action.

3. A guidance arrangement as claimed in claim 1 in which the actuating system comprises a means for balancing out any difference in the properties of the photosensitive elements, a difference amplifier, and a gate circuit coupled to the difference amplifier output and actuated in response to the sign of the difference amplifier output to cause the corresponding motion of a control member.

4. A guidance arrangement as claimed in claim 1 further comprising indicator means for giving an audio indication of the sign of a deviation off course.

5. An angular position sensor substantially as set forth in claim 1, further comprising:
two oppositely disposed arcuate notches on the periphery of said polarizing card, each of said notches substending an angle of 90° and having radially extending edges; and
two stops fixed to said casing each of said stops contiguous to a different one of said arcuate notches and adapted to abut against said radially extending edges of said arcuate notches to limit the rotation of said card.

6. An angular position sensor as defined in claim 1, wherein:
said light-polarizing segments are quadrants of circles; and
means defining an air space in said casing to provide space into which said liquid may be displaced upon expansion of said liquid.

7. An angular position sensor as defined in claim 1, including:
program means operatively associated with said light-polarizing segments which position said segments in accordance to a pre-determined required course at a vessel to which said sensor is associated is to follow; and
signal means associated with said sensor which gives a measure of the deviation of said vessel from said pre-determined required course.

* * * * *